United States Patent
Okada

(10) Patent No.: US 6,793,948 B2
(45) Date of Patent: Sep. 21, 2004

(54) HIGH QUALITY DRIED BOUILLON AND METHODS FOR PREPARATION THEREOF

(75) Inventor: Kineo Okada, Tokyo (JP)

(73) Assignee: Ariake Japan Co., Tokyo (JP)

( * ) Notice: Subject to any disclaimer, the term of this patent is extended or adjusted under 35 U.S.C. 154(b) by 217 days.

(21) Appl. No.: 10/190,882

(22) Filed: Jul. 3, 2002

(65) Prior Publication Data

US 2004/0005397 A1 Jan. 8, 2004

(51) Int. Cl.[7] .............................................. A23L 1/313
(52) U.S. Cl. .................. 426/78; 426/129; 426/589; 426/655; 426/657; 426/437; 426/468; 426/506; 426/513
(58) Field of Search .......................... 426/78, 129, 589, 426/655, 657, 437, 466, 506, 513

(56) References Cited

U.S. PATENT DOCUMENTS

| | | | |
|---|---|---|---|
| 3,099,562 A | | 7/1963 | Rogers |
| 3,394,017 A | * | 7/1968 | Giacino ...................... 426/533 |
| 3,666,491 A | * | 5/1972 | Touba ......................... 426/293 |
| 4,009,286 A | | 2/1977 | Moll et al. |
| 4,016,295 A | | 4/1977 | Burrows et al. |
| 4,218,487 A | * | 8/1980 | Jaeggi ........................ 426/533 |
| 4,362,750 A | | 12/1982 | Swartz |
| 4,411,991 A | | 10/1983 | Hirakawa et al. |
| 4,432,997 A | | 2/1984 | Reimerdes |
| 4,587,127 A | | 5/1986 | Akao et al. |
| 4,759,933 A | | 7/1988 | Uchida et al. |
| 4,820,529 A | | 4/1989 | Uchida et al. |
| 4,963,370 A | | 10/1990 | Uchida et al. |
| 5,431,940 A | | 7/1995 | Calderas et al. |
| 5,486,367 A | | 1/1996 | Fung |
| 5,695,802 A | * | 12/1997 | Van Den Ouweland et al. . 426/533 |
| 6,063,410 A | | 5/2000 | Vedamuthu et al. |
| 6,077,546 A | | 6/2000 | Iritani et al. |
| 6,103,282 A | | 8/2000 | Nakashima |
| 6,110,510 A | | 8/2000 | Blortz et al. |
| 6,126,979 A | * | 10/2000 | Herreid et al. ............... 426/285 |

FOREIGN PATENT DOCUMENTS

JP 08-154628 * 6/1996

OTHER PUBLICATIONS

De Marchis, et al "Review:Carnosine–Related Dipeptides in Neurons and Glia" http://www.protein.bio.msu.ru/biokhimiya/contents/vbs/full/65070969.htm.

Kaur, et al "Concentration of Anserine and Carnosine in Surimi Wash Water" http://www.ca... fex.com/ift/98annual/accepted/364.htm.

Zhou, et al "Ability of CarnosineRelated Dipeptides and Amino Acids to Quench Aldehydic Lipid Oxidation Products" http://www.confex.com/ift/98 annual/accepted/1040.htm.

Huang, et al "Concentrations and Antioxidative of Anserine and Carnosine in Poultry Meat Extracts Treated with Demineralization and Papain" Proc. Natl SciCounc.Roc(B), vol. 24, No. 4, 2000 pp 193–201.

* cited by examiner

Primary Examiner—N. Bhat
(74) Attorney, Agent, or Firm—Milde & Hofberg LLP

(57) ABSTRACT

An edible dry animal product comprising a dehydrated mixture of meat and meat extract and/or bone extract, contained within a water-permeable flexible container adapted for hot water extraction of soluble materials while retaining insoluble materials. The meat is preferably chicken. The dehydrated mixture may be rapidly extracted to form a chicken bouillon, resulting in a product having superior sensory quality. A method for preparing a chicken bouillon, comprising the steps of directly mixing chicken extract and chicken meat; dehydrating the mixture; and forming a powder from the dehydrated mixture. A powdered chicken bouillon is produced comprising a dehydrated mixture of chicken meat and chicken meat extract and/or bone extract, wherein said chicken meat and/or bone extract is mixed directly with the chicken meat prior to dehydration.

26 Claims, No Drawings

HIGH QUALITY DRIED BOUILLON AND METHODS FOR PREPARATION THEREOF

FIELD OF THE INVENTION

The present invention related to the field of improved natural animal bases; particularly chicken type bouillon, and production methods therefore.

BACKGROUND OF THE INVENTION

In order to make chicken bouillon or consommé from chicken bones, chicken meat, and vegetables for hotel, restaurant, and household use, known techniques require anywhere from several hours, to in excess of ten hours, to complete the extraction process. Furthermore, the production process requires complicated work involving heat adjustment, scum removal, filtration, clarifying the liquid, and boiling it down to the proper concentration. A quality and taste of the product depends on the skill and experience of the person preparing the chicken bouillon or consommé. Thus, it is difficult to maintain uniform product quality and flavor.

Traditional cooking methods for producing high quality, natural bouillon, soup, and broth/stock, from raw meat and/or bones, requires placing the raw meat and/or bones in boiling water, and continuing the extraction for a long period of time, from several hours to over ten hours. Furthermore, in order to produce high quality soup, the production process requires complicated work involving heat adjustment, scum removal, filtration, liquid clarification, and boiling it down to the proper concentration. The experience and skill level of the person preparing the soup can have a significant impact on product quality, making it difficult to maintain product uniformity. Bouillon or consommé products currently on the market are made with large quantities of added salt and artificial seasonings to enhance the otherwise weak flavor. These products have impaired consumer acceptance As used herein, a bouillon shall be interpreted to be a generic term encompassing a soup, bouillon, broth or stock, or other product intended to be consumed as a liquid, without regard for solids concentration. These products are related as follows. A bouillon and broth are respective French and English terms for boiled meat, fowl or fish soup. A consommé is a clarified broth prepared according to a traditional recipe. A stock is a broth which is used as a starting point for recipes.

Imitation chicken bouillon products currently on the market have significant deficits as compared to an authentic chicken bouillon, prepared as discussed above. The imitation products derive their flavor from hydrolyzed or fermented vegetable protein or yeast extract (e.g., autolyzed yeast extract), and seasonings. Any meat component of these products is generally not responsible for the principal flavor characteristics of the products. Other additives may also include spray dried extracted soup stock, amino acids, sugars, and salt. The blended dry product is solidified into cubes and put on the market and used as such.

Mixed bouillon products made from dried chicken powder, to which such ingredients as chicken extract powder and vegetable powder are simply added, have no balance of their taste and aroma, lack natural smoothness, and their product quality is different from that of chicken bouillon made according to traditional cooking techniques.

There have not previously been known any dried chicken bouillon products with the same high quality as the chicken bouillons made by chefs in hotels and restaurants that use natural products for all of its ingredients, such as chicken meat and bones, vegetables, spices, etc., while providing improved economic efficiency, simplicity, quality dependability, and safety of the products.

SUMMARY AND OBJECTS OF THE INVENTION

The present invention provides a dry product including uncooked chicken meat, and extract of chicken, which are directly mixed, and then dehydrated, as the basis for a quickly extractable high quality bouillon or consommé.

The present invention also provides a dry product including meat and meat and/or bone extract, which are mixed and placed within a filter medium, to allow rapid extraction of soluble materials while retaining insoluble materials for easy separation. The product may be prepared by immersion or drip filtration.

According to one aspect of the the present invention, a chicken product is provided having a similar flavor profile to traditionally prepared chicken bouillon, which is prepared by placing the product in boiling water for one to three minutes. The product includes non-soluble components, so a preferred embodiment of the invention provides an integral filter or strainer, similar to a tea bag, to retain the clarity of the resulting product and facilitate use.

A preferred embodiment of the invention is formed, for example, as a mixture of finely chopped chicken meat with added chicken extract, which is heated, dehydrated, and ground, to produce powdered chicken bouillon. Preferably, vegetables and spices are added prior to cooking, and the chicken extract is derived from meat and/or bone. The mixture of chicken meat and chicken extract is preferably formed into thin sheets before dehydration.

A boiling water extract of the product is consistently high in quality, and easy-to-prepare. The taste compares favorable to traditionally prepared chicken bouillon, but without requiring special skills or an extended time for preparation. The invention therefore provides, in one aspect, a natural food base in the form of dried chicken bouillon made from a dehydrated direct mixture of chicken meat and chicken extract. More particularly, one aspect of the present invention provides a natural food base in the form of dried chicken bouillon made from a dried mixture of uncooked chicken meat as the principal ingredient, with added chicken meat extract and/or bone extract, characterized by the dehydration of the chicken meat together with added chicken meat extract and/or bone extract, and/or vegetables, and/or spices.

The present invention also provides dry powder mixtures of other meat and animal extract, to provide improved flavor characteristics due to the inclusion of a meat component, and the rapid extraction characteristics of an extract. A filter is preferably provided to retain particulates and insoluble matter, while permitting rapid extraction in boiling water. The filter is, for example, a water-permeable sealed paper or porous bag, and may include woven or non-woven fabrics.

The invention provides a natural food base whose taste, aroma, and color can be changed as desired by altering the ratios of principal components (e.g., meat and animal extract) and optional components (vegetables, spices, seasonings).

The animal extract, e.g., chicken meat extract and/or bone extract, can be in liquid, powdered, or other form. The vegetables can be in the form of vegetables, vegetable juice, vegetable extract, vegetable extract powder, etc., and the spices can be in the form of spices, spice extract, etc.

The mixed ingredients are preferably formed into thin sheets for higher drying efficiency during the dehydration process.

The taste, aroma, and color may be changed as desired by altering the ratios of added chicken meat and/or bone extract, and/or vegetables, and/or spices in the mixture.

Table 1 shows the results of an analysis of existing chicken bouillon products. Mixed bouillon products made from dried chicken powder, to which such ingredients as chicken extract powder and vegetable powder are simply added, have no balance between their taste and aroma, lack natural smoothness, and their product quality is different from that of chicken bouillon made according to traditional cooking techniques.

TABLE 1

Analysis Results of Bouillon on the Market (%)

| | Crude protein | Monosodium Glutamate | Crude fat | Ash content | Salt content |
|---|---|---|---|---|---|
| Company A's bouillon cube | 8.7 | 9.2 | 2.2 | 58.9 | 54.9 |
| Company B's consommé cube | 7.7 | 8.4 | 4.2 | 43.8 | 41.1 |
| Company C's chicken consommé cube | 15.8 | 7.8 | 8.1 | 34.0 | 31.0 |

Through the present invention, a product quite similar to the chicken bouillon, that is traditionally made through several hours of extraction, can be made by extraction for 1–3 minutes in boiling water of a dried bouillon made from a mixture of principally chicken meat, chicken meat extract and/or bone extract, and vegetables, that is dehydrated, ground, and blended with spices.

The flavor can be readily adjusted by changing the combination and ratios of ingredients, e.g., the amounts of added chicken meat extract and/or bone extract, the amounts and types of vegetables (celery, onions, carrots, etc.) and spices. Accordingly, the dried chicken bouillon can be produced in any number of ways to suit people's preferences.

The bouillon according to the present invention contains many anserine and carnosine peptides and amino acids that lower stress, act as antioxidants against harmful free radicals, and provide anti-cancer and anti-aging benefits.

DETAILED DESCRIPTION OF THE PREFERRED EMBODIMENTS

This invention is explained in detail using the following practical examples. However, the intended uses for this invention are not limited to the examples given.

According to a preferred embodiment, first, the broth/stock is made from the chicken meat and/or its bones. That is, the chicken meat and bones are extracted with hot water. This may, of course, be conducted in an industrial scale process. Further, the meat and bones may be extracted separately. The broth/stock is condensed and made into a highly concentrated extract. Alternatively, it is made into chicken extract powder through spray-drying methods, etc. The extract may also be obtained commercially.

Any chicken parts (breast, white meat, dark meat) may be used. However, better tasting dried chicken bouillon can be produced by using breast meat or white meat, which contains more inosinic acid. Table 2 shows the analysis results of nucleic acid-related substances. Also, the results of the fat analysis of chicken meat show that the fat content in breast, white meat, and dark meat is 1.0%, 1.4% and 6.5%, respectively. In general, dark meat contains more fat and, therefore, when dried, its taste can easily deteriorate due to oxidation of the fat (e.g., formation of lipid peroxides). Based on the above analysis, it is preferred to use breast meat and/or white meat for production of dried chicken bouillon.

TABLE 2

Results of Analysis of Nucleic Acid-Related Substances by Chicken Part (mg/100 g)

| | Breast | White meat | Dark meat |
|---|---|---|---|
| AMP | 7.87 | 7.81 | 7.75 |
| IMP | 161.81 | 152.86 | 79.77 |
| GMP | 4.41 | 3.77 | 2.35 |
| ADP | 8.81 | 7.29 | 5.75 |
| ATP | 2.78 | 1.86 | 1.41 |

Uncooked chicken meat is cut into small pieces, to which chicken extract powder and vegetables (celery, onions, carrots) are added. Normally, the addition of 1–20% by weight chicken extract powder and 1–20% by weight vegetables to chicken meat is appropriate. However, the amount is not necessarily limited to this range. Depending on the ingredients used or targeted food base, they may be used in higher or lower concentration.

After adding ingredients, the mixture is blended thoroughly, and filled into containers for forming and heating. The mixed ingredients are shaped into thin sheets, so that the subsequent process involving dehydration can be carried out efficiently. Specifically, the mixture may be shaped into a 5–20 mm thick sheet using a waterproof casing. However, the thickness is not limited to this range. Depending on the ingredients used, the mixture can be dehydrated from a thinner or thicker sheet. The encased mixture is heated for sterilization and coagulation of ingredients, such as the chicken meat. The waterproof casing may, for example, be immersed in hot water for this purpose. If bacterial contamination or proliferation are not a concern, the heating process may be omitted. Also, if bacteria contamination or proliferation do not pose a concern, an aging process may be conducted.

For the dehydration process, a forced-air drying method is normally used, but other methods such as freeze-drying or vacuum-drying can also be used. In the forced-air drying method, the mixed ingredients go through repeated steps of being dried at a high temperature and being left at a low temperature, thereby improving efficiency in the dehydration process. The reason for this, is that when the drying of the mixture is carried out all at one time at a high temperature, the surface hardens, impeding the ability of the liquid inside to evaporate. The dehydration process becomes more efficient when the mixture is chopped and ground after reaching a certain moisture content, and then dried again.

Dried chicken bouillon is made using the above methods. Spices can be added either before or after dehydration. If added before drying, their flavor is melded into the flavor-profile and is more mellow. If added after drying, they retain their fresh flavor.

A sensory evaluation was performed on three kinds of chicken bouillon: one made through traditional methods involving long hours of cooking, one made under the methods according to the present invention, and one made from a simple mixture of dried meat and extract, all having the same ingredient ratios, the results of which are shown in Table 3. Five well-trained judges conducted the sensory evaluation.

TABLE 3

Sensory Evaluation

|  | Basic bouillon cooked for a long time | Present invention | Extract powder mix |
|---|---|---|---|
| Aroma | smells natural | smells natural well-cooked smell | smell of extract stays raw smell |
| Taste | tastes smooth | tastes smooth mellow taste | not smooth poorly-blended taste |
| Appearance | clear (no turbidity) | clear (no turbidity) | not clear |

TABLE 4

Time of Extraction for Chicken Bouillon Powder

| CHICKEN BOUILLON | 1 min | 2 min | 3 min |
|---|---|---|---|
| ASP | 4.92 | 5.64 | 5.80 |
| THR | 6.39 | 7.16 | 7.55 |
| SER | 6.83 | 7.72 | 8.09 |
| GLU | 15.86 | 17.93 | 18.96 |
| PRO | 1.81 | 1.07 | 3.16 |
| GLY | 5.96 | 6.60 | 6.85 |
| ALA | 9.65 | 10.86 | 11.37 |
| CYS | 0.24 | 0.28 | 0.29 |
| VAL | 3.71 | 4.23 | 4.52 |
| MET | 2.10 | 2.35 | 2.52 |
| ILE | 2.50 | 2.86 | 3.07 |
| LEU | 4.96 | 5.77 | 6.12 |
| TYR | 2.92 | 3.67 | 3.78 |
| PHE | 0.20 | 0.20 | 0.59 |
| LYS | 26.12 | 31.07 | 34.81 |
| HIS | 2.85 | 3.34 | 3.53 |
| ARG | 4.31 | 5.29 | 5.76 |
| TOTAL-AA | 101.33 | 116.04 | 126.77 |
| IMP | 29.44 | 36.24 | 39.85 |
| GMP | 0.43 | 1.17 | 1.33 |
| TOTAL | 131.20 | 153.45 | 167.95 |
| Above expressed as mg/100 g | | | |
| RATIO (%) | 78.1 | 91.4 | 100.0 |
| BRIX | 2.0 | 2.2 | 2.2 |

20 gm Dried bouillon in 300 ml Hot water:
Analysis of extracted compounds.

By simply extracting the dried chicken bouillon produced through above process for one to three minutes in boiling water, e.g., by immersing a sealed water permeable bag containing the powder in boiling water, and then removing it after the extraction period has expired, anyone can make chicken bouillon of the same quality as that made in a couple of hours to over ten hours by professional chefs, with extensive experience in cooking techniques. In other words, the present invention provides a dried chicken bouillon having economic efficiency, simplicity, consistent quality, and safety. In addition, peptides from the chicken bouillon such as anserine and carnosine lower stress, act as antioxidants against harmful free radicals, and provide anti-cancer and anti-aging benefits.

Up to the present, there have not been any dried chicken bouillons from which a high quality chicken bouillon as those made by chefs in hotels and restaurants could be extracted in a short time (1–3 minutes) without painstaking efforts. Also, there have not been any food bases made from a dried mixture of chicken meat with extract.

EXAMPLE 1

First, 20 kg of water was added per 10 kg of whole chicken. The chicken was boiled in hot water at about 95° C. for 2 hours for extraction, while evaporating and separating oil from the liquid. The liquid was concentrated to 32 Brix to produce chicken extract.

The chicken extract concentrated to 32 Brix was made into powder through spray-drying. Specifically, the 32 Brix chicken extract was heated for sterilization at 95° C. for 30 minutes, and then spray-dried at an inlet temperature of 180° C. and outlet air temperature of 80° C. to produce the chicken extract powder.

50 g of chicken extract powder was added per 500 g of chicken breast meat, with 150 g of vegetable paste made from celery, onions, and carrots formed in a blender also added. These materials were blended thoroughly in a food mixer.

After mixing and blending, 250 g of the mixture was stuffed into a waterproof casing (100 mm wide×230 mm long) using a stuffer machine. Afterwards, it was leveled to provide an even thickness of about 20 mm, so that the mixture could be dried evenly. The mixture was then heated in hot water to about 95° C. for 30 minutes.

Next, the mixture was dehydrated using a forced-air dryer. Specifically, the mixture was dried at a high heal of 70° C. for 12 hours, and then left for 12 hours at 15° C. Then the mixture was dried for another 12 hours at 60° C., and left again for 12 hours at 15° C. The moisture content at that time was about 30% . The final moisture content of 5% was able to be reached by slicing the mixture to a thickness of 1 mm and drying it again at 60° C. for four hours.

Ground black pepper was added to the dried product, and 20 g of this dried product was filled into a non-woven fabric cloth to make a dried chicken bouillon product. By extracting the dried chicken bouillon in the porous cloth bag in 300 g of hot water for about 3 minutes, a high-quality chicken bouillon (chicken consommé) sufficient for two portions was obtained.

EXAMPLE 2

First, 20 kg water was added per 10 kg of whole chicken. The chicken was boiled in hot water at about 95° C. for 2 hours of extraction while evaporating and separating oil from the liquid. The liquid was concentrated to 32 Brix to produce chicken extract.

The chicken extract concentrated to 32 Brix was made into powder through spray-drying. Specifically, the 32 Brix chicken extract was heated for sterilization at 95° C. for 30 minutes, and then spray-dried at an inlet temperature of 180° C. and outlet air temperature of 80° C. to produce the chicken extract powder.

5 g of chicken extract powder was added per 500 g of chicken meat. Next, 10 g of carrot, onion, leek, and celery extracts were added along with 0.2 g bay leaf, 0.2 g black pepper, and 1.7 g tarragon. These materials were fully blended with a food mixer.

After mixing and blending, 250 g of the mixture was stuffed into a waterproof casing (100 mm wide×230 mm long) using a stuffer machine. Afterwards, is was leveled to provide an even thickness of about 20 mm, so that the mixture could be dried evenly. The mixture was then heated in hot water to about 95° C. for 30 minutes.

Next, the mixture was dehydrated using a forced-air dryer. Specifically, the mixture was dried at a high heat of 70° C. for 12 hours, and then left for 12 hours at 15° C. Then the mixture was dried for another 12 hours at 60° C., and left again for 12 hours at 15° C. The moisture content at that time was about 30%. The final moisture content of 5% was able to be reached by slicing the mixture to a thickness of 1 mm and drying it again at 60° C. for four hours.

20 g of the dried chicken product was filled into a porous bag to make a dried chicken bouillon product. By extracting the dried chicken buillon product in the bag in 300 g of hot water for about 3 minutes, a high-quality chicken bouillon (chicken consommé) sufficient for two servings was obtained.

Up to the present, there have not been any food bases capable of delivering high quality chicken bouillons as those prepared by chefs in hotels and restaurants, made with a dehydrated mixture of chicken meat, extracts, vegetables, and spices, nor have there been any such dried chicken bouillons that were able to be extracted to make a high quality product in a short amount of time.

Through the present invention, dried chicken bouillon is produced from a mixture of chicken meat and chicken extract, optionally with vegetables, and spices. The mixture is heated, dehydrated, and ground. The finished natural food base product is placed into boiling water where it is extracted in boiling water for a few minutes (1–3 minutes), thus offering an easy-to-prepare chicken bouillon with a consistent high quality.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. An edible animal product comprising raw animal meat and a mixture of one or more of animal extract and bone extract, co-mixed in a hydrated state and then dried.

2. The product according to claim 1, wherein said meat is chicken.

3. The product according to claim 1, further comprising a mixture of one or more of vegetables, and spices added to said meat prior to dehydration.

4. The product according to claim 1, wherein said mixture prior to dehydration is formed into thin sheets for dehydration.

5. The product according to claim 1, contained within a water-permeable container adapted for hot water extraction of soluble materials while retaining insoluble materials.

6. The product according to claim 5, wherein said container comprises a porous bag.

7. The product according to claim 5, wherein said container is formed of paper.

8. The product according to claim 1, wherein a soluble portion of said dehydrated mixture is substantially extracted into hot water within three minutes.

9. The product according to claim 7, wherein a resulting extract has a flavor of a traditional chicken bouillon.

10. The product according to claim 1, wherein said meat is chicken, and wherein said chicken is directly mixed with said mixture of one or more of meat extract and bone extract prior to dehydration.

11. The product according to claim 1, wherein a taste, aroma or color of the product is adjusted by controlling ratios of added mixture of one or more of meat extract and bone extract, vegetables or vegetable extract, and spices.

12. A method for preparing a dried chicken bouillon, comprising the steps of:
    (a) directly mixing chicken meat and chicken extract;
    (b) heating and dehydrating the mixture; and
    (c) forming a powder from the dehydrated mixture.

13. The method according to claim 12, wherein said mixture comprises principally chicken meat.

14. The method according to claim 12, wherein said mixture comprises at least 50% by weight chicken meat.

15. The method according to claim 12, wherein the mixture further comprises a mixture of one or more of vegetables and spices.

16. The method according to claim 12, further comprising the step forming the mixture into thin sheets prior to dehydration.

17. The method according to claim 12, further comprising the step of adjusting one or more of a taste, aroma, and color of the chicken bouillon by controlling the ratios of added mixture of one or more of meat and bone extract, vegetables or vegetable extract, and spices.

18. The method according to claim 12, wherein a resulting extract has a flavor of a traditional chicken bouillon.

19. The method according to claim 12, further comprising the step of placing the dried product within a water permeable container adapted for hot water extraction of soluble materials while retaining insoluble materials.

20. The method according to claim 12, further comprising the step of controlling a taste, aroma or color of the product by adjusting ratios of a mixture of one or more of added meat extract, bone extract, vegetables or vegetable extract, and spices.

21. A dried chicken bouillon prepared by the method according to claim 12.

22. A dried chicken bouillon comprising uncooked chicken meat mixed with a mixture of one or more of chicken meat extract and bone extract, said mixture being dried together and then powdered.

23. The dried chicken bouillon according to claim 22, within a water permeable container adapted for hot water extraction of soluble materials while retaining insoluble materials.

24. The dried chicken bouillon according to claim 22, wherein a soluble portion of said dehydrated mixture is substantially extracted into boiling water within three minutes.

25. The dried chicken bouillon according to claim 24, wherein a resulting extract has a flavor of a traditional chicken bouillon.

26. An edible dry animal product comprising a dehydrated mixture of one or more of meat and meat and bone extract, contained within a water-permeable container adapted for hot water extraction of soluble materials while retaining insoluble materials.

* * * * *